(12) United States Patent
Yang

(10) Patent No.: US 11,604,327 B2
(45) Date of Patent: Mar. 14, 2023

(54) OPTICAL ELEMENT DRIVING MECHANISM

(71) Applicant: TDK TAIWAN CORP., Taoyuan (TW)

(72) Inventor: Yung-Ping Yang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/579,922

(22) Filed: Jan. 20, 2022

(65) Prior Publication Data

US 2022/0137322 A1 May 5, 2022

Related U.S. Application Data

(63) Continuation of application No. 16/750,276, filed on Jan. 23, 2020, now Pat. No. 11,262,527.

(30) Foreign Application Priority Data

Dec. 20, 2019 (EP) ..................................... 19218896

(51) Int. Cl.
| | |
|---|---|
| G02B 7/04 | (2021.01) |
| G02B 7/18 | (2021.01) |
| G02B 7/182 | (2021.01) |
| G02B 13/00 | (2006.01) |
| G02B 26/08 | (2006.01) |
| G02B 27/00 | (2006.01) |
| H04N 5/225 | (2006.01) |
| G02B 7/09 | (2021.01) |

(Continued)

(52) U.S. Cl.
CPC ................. *G02B 7/04* (2013.01); *G02B 7/09* (2013.01); *G02B 7/182* (2013.01); *G02B 7/1805* (2013.01); *G02B 13/0075* (2013.01); *G02B 26/085* (2013.01); *G02B 26/0816* (2013.01); *G02B 27/0068* (2013.01); *G02B 27/646* (2013.01); *G03B 5/02* (2013.01); *H04N 5/2253* (2013.01); *H04N 5/2254* (2013.01); *H04N 5/2257* (2013.01); *G03B 2205/0015* (2013.01); *G03B 2205/0069* (2013.01)

(58) Field of Classification Search
None
See application file for complete search history.

(56) References Cited

U.S. PATENT DOCUMENTS

2008/0024590 A1 1/2008 Nakajima
2017/0272711 A1 9/2017 Mikawa
(Continued)

*Primary Examiner* — Jennifer D. Carruth
(74) *Attorney, Agent, or Firm* — Muncy, Geissler, Olds & Lowe, P.C.

(57) ABSTRACT

An optical element driving mechanism is provided, including a fixed part, a movable part and a driving assembly. The fixed part has a main axis, includes an outer frame and a base. The outer frame has a top surface and a sidewall. The top surface intersects the main axis. The sidewall extends from the edge of the top surface along the main axis. The base includes a base plate intersecting the main axis and securely connected to the outer frame. The movable part moves relative to the fixed part, and connects to an optical element having an optical axis. The driving assembly drives the movable part to move relative to the fixed part. The main axis is not parallel to the optical axis.

20 Claims, 14 Drawing Sheets

(51) Int. Cl.
*G02B 27/64* (2006.01)
*G03B 5/02* (2021.01)

(56) References Cited

U.S. PATENT DOCUMENTS

2018/0267294 A1    9/2018  Aschwanden et al.
2022/0283407 A1*   9/2022  Wu .......................... G03B 5/00

* cited by examiner

OPTICAL ELEMENT DRIVING MECHANISM

CROSS REFERENCE TO RELATED APPLICATIONS

This application is a Continuation of pending U.S. patent application Ser. No. 16/750,276, filed Jan. 23, 2020 and entitled "OPTICAL ELEMENT DRIVING MECHANISM", which claims priority to European Patent Application No. 19218896.9, filed on 20 Dec. 2019, the entirety of which is incorporated by reference herein.

BACKGROUND OF THE INVENTION

Field of the Invention

The present disclosure relates to an optical element driving mechanism, and more particularly to an optical element driving mechanism of an electrical device.

Description of the Related Art

As the relevant technologies have developed, many electronic devices (such as cameras and smartphones) can record images and videos. However, when a lens having a long focal length is provided in an electronic device, the thickness thereof may be increased, impeding the prospects for miniaturization of the electronic device. Therefore, an optical element driving mechanism capable of aiding in the miniaturization of the electrical device is an important issue.

BRIEF SUMMARY OF THE INVENTION

To solve the problems of the prior art, an optical element driving mechanism is provided, including a fixed part, a movable part and a driving assembly. The fixed part has a main axis, includes an outer frame and a base. The outer frame has a top surface and a sidewall. The top surface intersects the main axis. The sidewall extends from the edge of the top surface along the main axis. The base includes a base plate intersecting the main axis and securely connected to the outer frame. The movable part moves relative to the fixed part, and connects to an optical element having an optical axis. The driving assembly drives the movable part to move relative to the fixed part. The main axis is not parallel to the optical axis.

In one of the embodiments of the present disclosure, the top surface has an unequal long side and a short side when observed along the main axis, and the optical axis is parallel to the extending direction of the short side. The driving assembly is used for driving the movable part to move along the optical axis relative to the fixed part. The driving assembly further includes a driving magnetic element and a driving coil assembly, the driving coil assembly includes a circuit board and a driving coil disposed at the circuit board. The base further includes a circuit board positioning structure, the circuit board further includes a coil positioning structure, the coil positioning structure has a recess or an opening structure, and the coil positioning structure corresponds to the circuit board positioning structure. The circuit board further includes a plurality of coil positioning structures, disposed at two sides of the circuit board.

In one of the embodiments of the present disclosure, the driving coil assembly further includes a plurality of driving coils disposed in the circuit board, and the driving coils are arranged along the optical axis. The top surface has an unequal long side and a short side when observed along the main axis, and the optical axis is parallel to the extending direction of the short side, the arrangement direction of the driving coils is parallel to the extending direction of the short side. The optical element driving mechanism further includes a circuit assembly electrically connected to the driving coil assembly, wherein the circuit assembly includes a coil electrical connection part disposed between a first circuit board surface of the circuit board and a first circuit surface of the circuit assembly, the first circuit board surface faces the circuit assembly and the first circuit surface faces the circuit board, the coil electrical connection part at least partially overlaps the first circuit board surface and the first circuit surface when observed along the main axis, and the circuit board is electrically connected to the circuit assembly via the coil electrical connection part. The circuit board further includes a second circuit board surface facing opposite the first circuit board surface, the circuit assembly further includes a second circuit surface facing opposite the first circuit surface, the coil electrical connection part is not provided on the second circuit board surface or the second circuit surface, the coil electrical connection part at least partially overlaps the second circuit board surface and the second circuit surface when observed along the main axis.

In one of the embodiments of the present disclosure, the optical element driving mechanism further includes a circuit assembly electrically connected to the driving coil assembly and disposed at the base, wherein the circuit assembly includes a first section and a second section, the first section is electrically connected to the second section via a connecting circuit of the circuit board. The driving coil does not overlap the connecting circuit when observed in the direction perpendicular to the main axis, and the greatest size of the driving coil is different from the greatest size of the connecting circuit along the main axis.

In one of the embodiments of the present disclosure, the optical element driving mechanism further includes a circuit assembly electrically connected to the driving coil assembly and disposed at the base, wherein the base further includes a first opening, and the circuit assembly includes a first embedded part, a first exposed part, a second embedded part and a second exposed part. The first embedded part is embedded in the base and is not exposed. The first exposed part is electrically connected to the first embedded part and is exposed to the first opening. The second embedded part is embedded in the base and is not exposed. The second exposed part is electrically connected to the second embedded part and is exposed to the first opening. The first exposed part is electrically independent from the second exposed part. The circuit assembly further includes a third exposed part partially exposed to a second opening of the base, and the second opening does not accommodate other circuits that are electrically independent from the third exposed part. The base further includes a plurality of recesses disposed at two sides of the first opening. The circuit board at least partially overlaps the first opening when observed along the main axis.

In one of the embodiments of the present disclosure, the base further includes a recess, a surface of the first exposed part, a surface of the second exposed part and a recess surface of the recess are located on a same imaginary plane. The first opening further includes a first opening side in contact with the recess surface, but the first opening side and the recess surface are not parallel to each other, the first exposed part and the second exposed part at least partially exposed to the first opening side. The optical element driving mechanism further includes an adhesive element disposed between the circuit board and the base, and the adhesive element at least partially overlaps the first opening when observed along the main axis. The adhesive element at least partially overlaps the first opening when observed in the direction perpendicular to the main axis.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
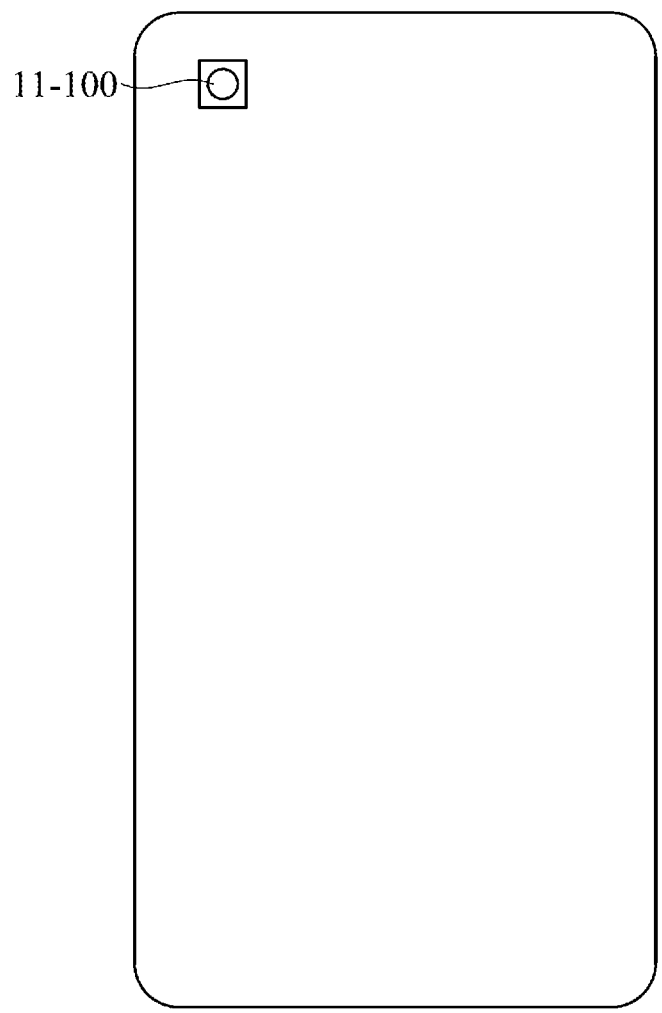
FIG. 1 shows a schematic view of an electrical device with an optical element driving mechanism according to an embodiment of the present disclosure.

Firstly, please refer to FIG. 1, an optical element driving mechanism 11-100 of an embodiment of the present disclosure may be mounted in an electrical device 11-1 for taking photos or videos, wherein the aforementioned electrical device 11-1 may, for example, be a smartphone or a digital camera, but the present disclosure is not limited to these. It should be noted that the position and the size between the optical element driving mechanism 11-100 and the electrical device 11-1 shown in FIG. 1 are only an example, which is not for limiting the position and the size between the optical element driving mechanism 11-100 and the electrical device 11-1. In fact, according to different needs, the optical element driving mechanism 11-100 may be mounted at different positions in the electrical device 11-1.

Figure 2:
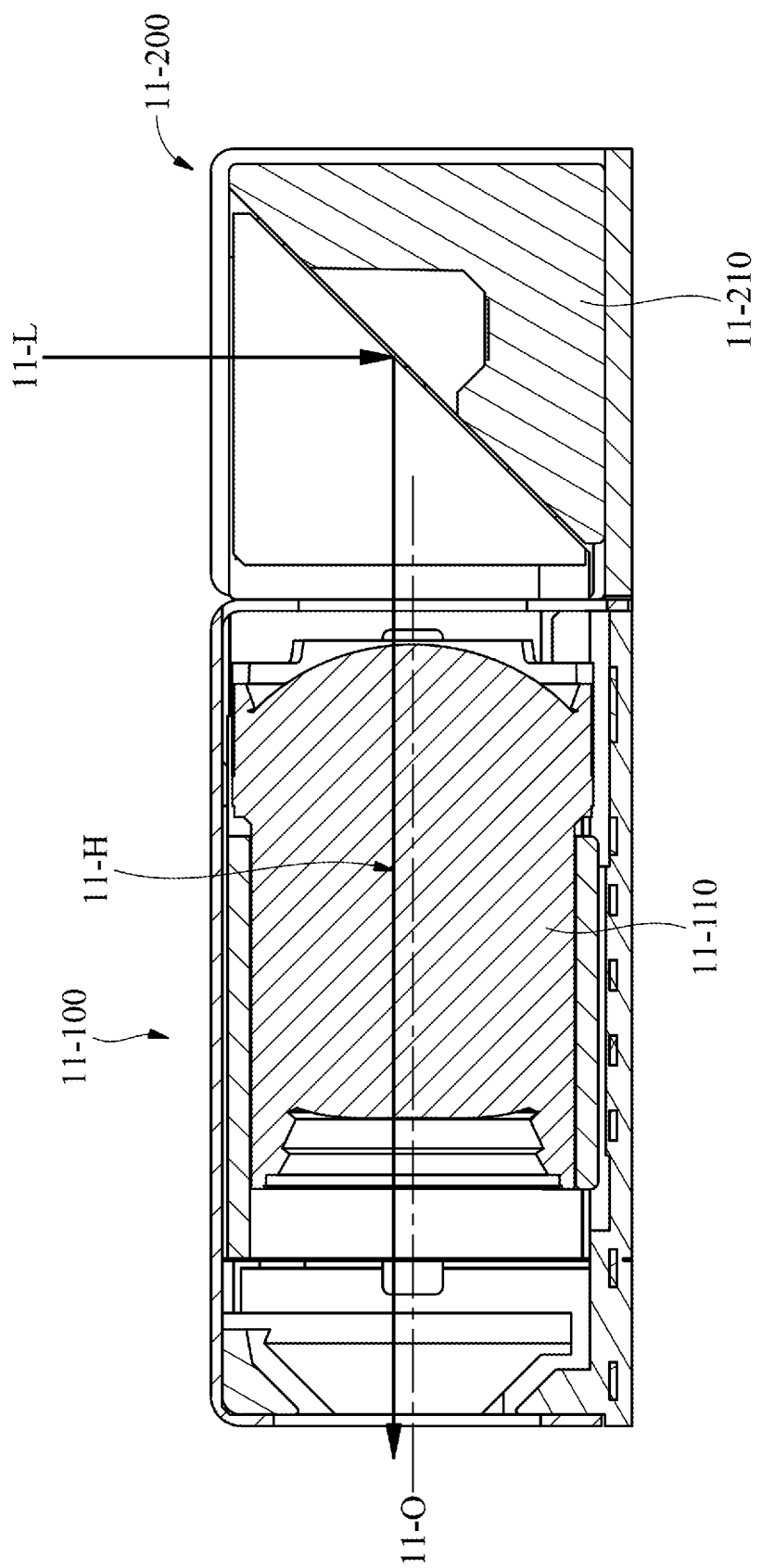
FIG. 2 shows a schematic view of the optical element driving mechanism and a prism module according to an embodiment of the present disclosure.

Please refer to FIG. 2, the optical element driving mechanism 11-100 carries an optical element 11-110 with an optical axis 11-O. A prism module 11-200 may be disposed outside of the optical element driving mechanism 11-100. The prism module 11-200 is located at the upstream of the light entry of the optical element driving mechanism 11-100. A light 11-L incident to a prism 11-210 of the prism module 11-200, and then reflected by the prism 11-210 to an optical path 11-H, and passing through the optical element 11-110 for imaging.

Figure 3:
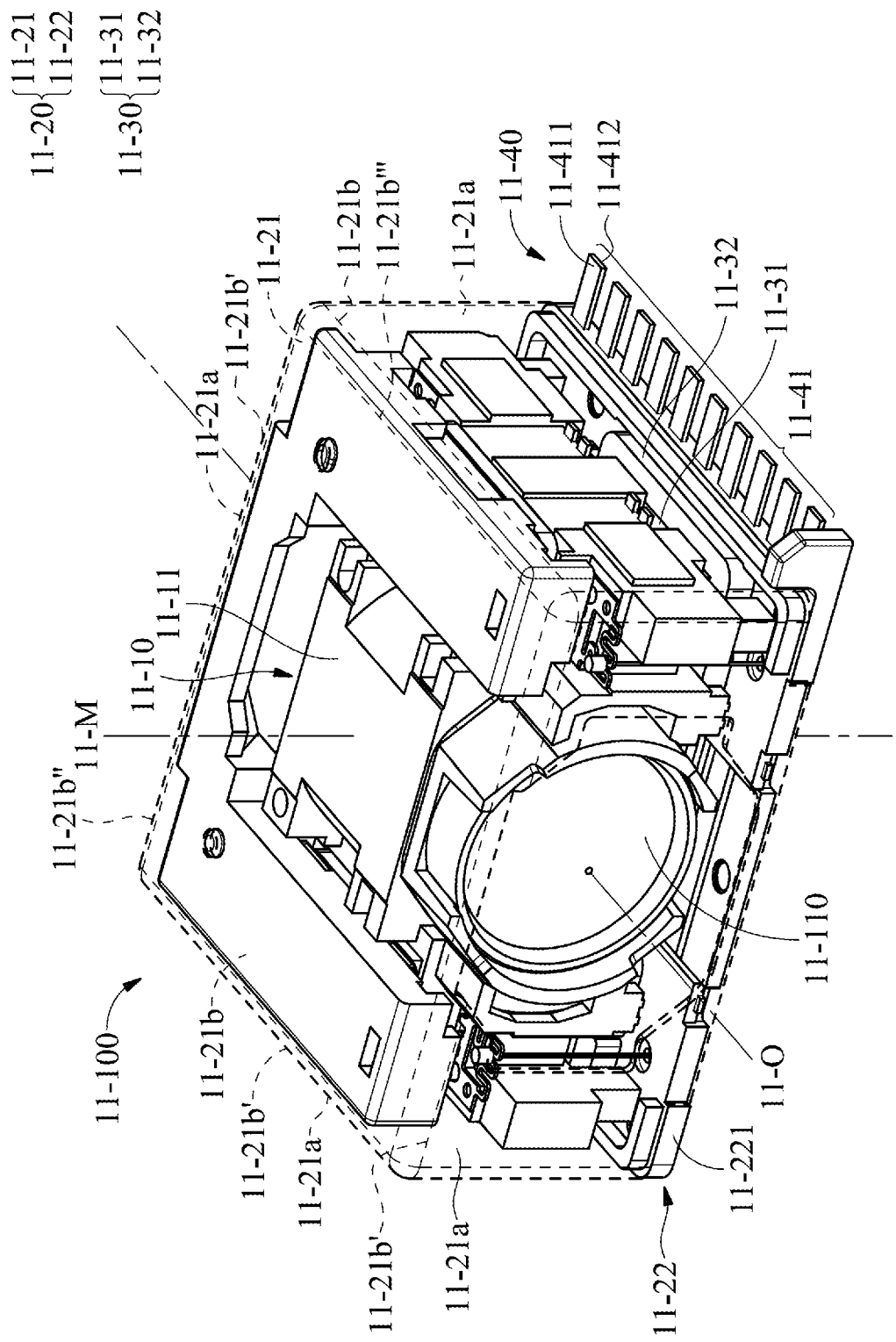
FIG. 3 shows a perspective view of the optical element driving mechanism and an optical element according to an embodiment of the present disclosure, wherein an outer frame of the optical element driving mechanism is shown as a dashed line.
Figure 4:
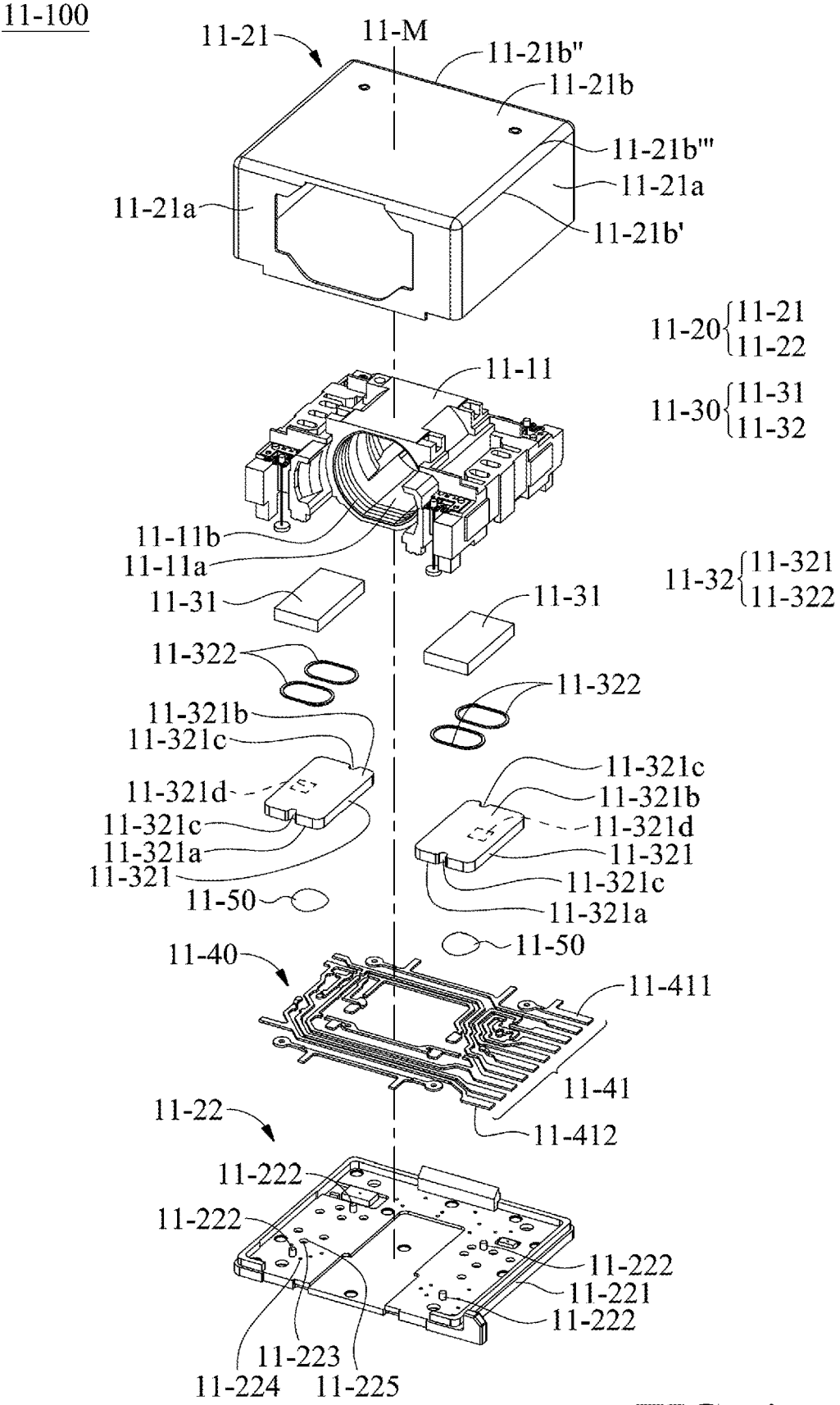
FIG. 4 shows an exploded view of the optical element driving mechanism according to an embodiment of the present disclosure.

Please refer to FIG. 3, the optical element driving mechanism 11-100 includes a movable part 11-10, a fixed part 11-20, a driving assembly 11-30, a circuit assembly 11-40 and an adhesive element 11-50 (please refer to FIG. 4). The adhesive element 11-50 may be the material of a soldering tin or a glue for fixing and securing.

As shown in FIG. 3, the movable part 11-10 is in contact with the optical element 11-110. The movable part includes a holder 11-11. Please refer to FIG. 4, the holder 11-11 of the movable part 11-10 has a hollow ring structure, and has a through hole 11-11a and a threaded structure 11-11b formed on the through hole 11-11a, and the optical element 11-110 may be locked in the through hole 11-11a via the threaded structure 11-11b.

Please refer to FIG. 3 again, the fixed part 11-20 includes an outer frame 11-21 and a base 11-22, and the fixed part 11-20 has a main axis 11-M. The main axis 11-M is not parallel to the optical axis 11-O. In the present embodiment, the main axis 11-M is perpendicular to the optical axis 11-O. The outer frame 11-21 has four sidewalls 11-21a and a top surface 11-21b. The sidewall 11-21a extends from an edge 11-21b' of the top surface 11-21b along the main axis 11-M. That is, the sidewall 11-21a is significantly parallel to the main axis 11-M. The top surface 11-21b intersects with the main axis 11-M, more specifically, the main axis 11-M perpendicularly penetrates the top surface 11-21b. The top surface 11-21b has a long side 11-21b" and a short side 11-21b'''. The extending direction of the short side 11-21b''' is parallel to the optical axis 11-O, while the extending direction of the long side 11-21b″ is not parallel to the optical axis 11-O. Please refer to FIGS. 3 and 4 at the time, the base 11-22 includes a base plate 11-221, four circuit board positioning structures 11-222, a first opening 11-223, a second opening 11-224 and a plurality of recess 11-225. The base plate 11-221 intersects the main axis 11-M, and securely connects to the outer frame 11-21.

Please refer to FIG. 4, the driving assembly 11-30 includes two driving magnetic elements 11-31 and a driving coil assembly 11-32. The driving assembly 11-30 may drive the movable part 11-10 to move relative to the fixed part 11-20, and the driving assembly 11-30 is electrically connected to the circuit assembly 11-40. The driving coil assembly 11-32 has two circuit boards 11-321 and four driving coils 11-322. The circuit board 11-321 includes a first circuit board surface 11-321a, a second circuit board surface 11-321b, two coil positioning structures 11-321c and a connecting circuit 11-321d.

Please refer to FIG. 3, the circuit assembly 11-40 is disposed in the base 11-22 of the fixed part 11-20. The circuit assembly 11-40 includes a plurality of circuits 11-41. The circuit 11-41 has a first circuit surface 11-411 and a second circuit surface 11-412.

Figure 5:
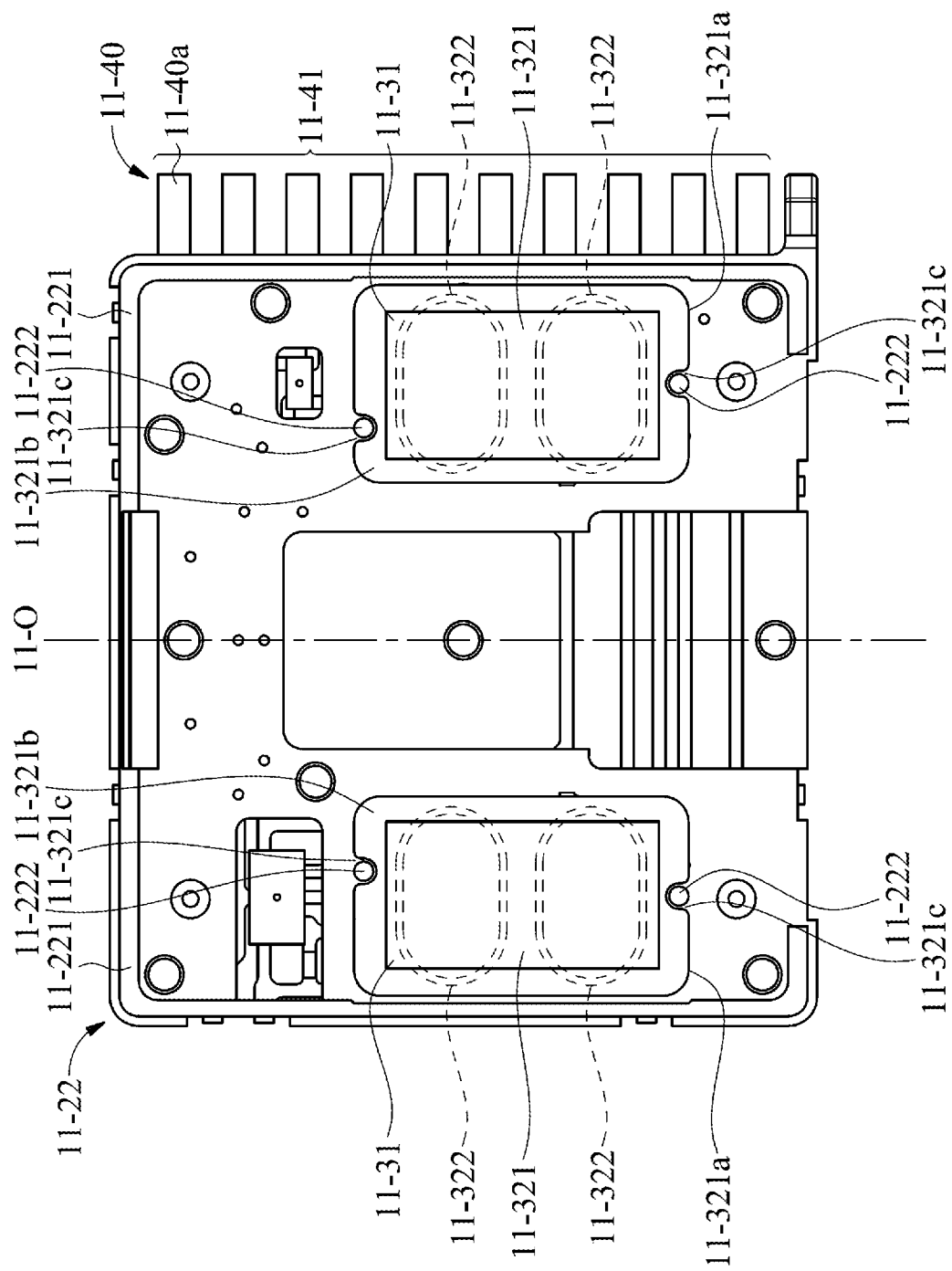
FIG. 5 shows a schematic view of a base, a circuit board, a driving magnetic element and a circuit assembly of the optical element driving mechanism according to an embodiment of the present disclosure.

Please refer to FIG. 5, the circuit board 11-321 is disposed on the base plate 11-221, and the driving magnetic element 11-31 is disposed above the circuit board 11-321. Four driving coils 11-322 are disposed in the circuit boards 11-321 respectively, and the driving coils 11-322 are corresponding to the driving magnetic elements 11-31. It should be noted that the driving coils is not limited to be four. In some embodiments, there may by one, two, three or more driving coils 11-322. The driving coil 11-322 may generate an electromagnetic driving force to drive the holder 11-11 of the movable part 11-10 to move along the optical axis 11-O relative to the fixed part 11-20 when a current is applied to the driving coil 11-322. The first circuit board surface 11-321a of the circuit board 11-321 faces the circuit 11-41 of the circuit assembly 11-40, and the second circuit board surface 11-321b faces opposite the first circuit board surface 11-321a (please also refer to FIG. 9).

As shown in FIG. 5, two coil positioning structures 11-321c of each circuit boards 11-321 have a recess or an opening structure, and the coil positioning structures 11-321c are located at the opposite sides of the circuit boards 11-321c. The circuit board positioning structure 11-222 of the base 11-22 of the fixed part 11-20 corresponds to the coil positioning structure 11-321c, and the circuit board positioning structure 11-222 is located in the recess of the coil positioning structure 11-321c to prevent the circuit board 11-321 and the driving coil 11-322 in the circuit board 11-321 from moving relative to the base 11-22 during impact. It should be noted that the circuit board 11-321 is not limited to be two, and the coil positioning structure 11-321c and the circuit board positioning structure 11-222 are not limited to be four. In some embodiments, there may be one, three, or more circuit boards 11-321, and there may be one, two, three, five, or more coil positioning structures 11-321c and the circuit board positioning structures 11-222. Moreover, the positions of the coil positioning structures 11-321c are not limited to the opposite sides of the circuit board 11-321. In some embodiments, the coil positioning structures 11-321c may be located at any one side, any two sides, any three sides, or any four sides of the circuit board 11-321c.

Figure 6:
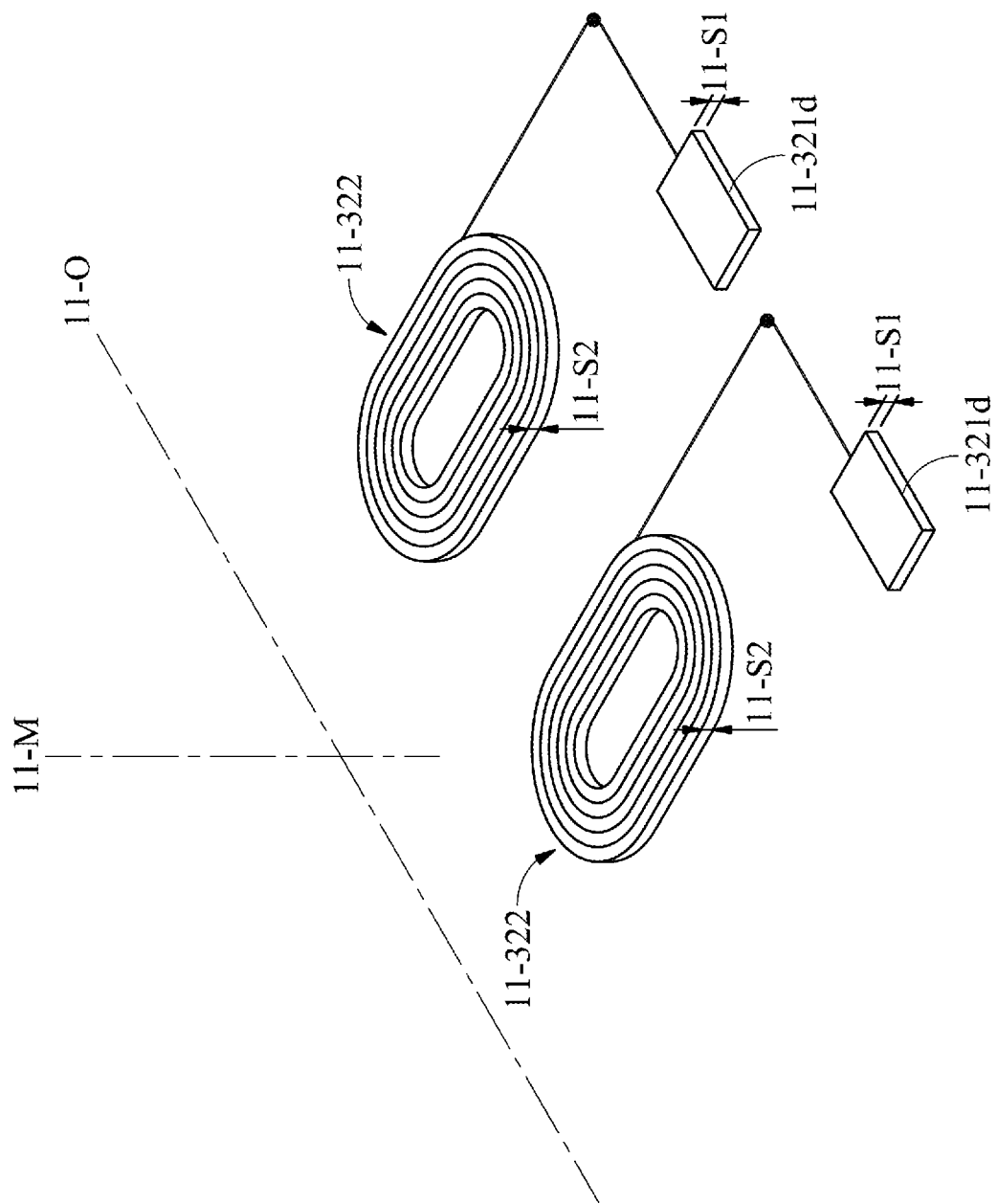
FIG. 6 shows a schematic view of a driving coil and a connecting circuit of the circuit assembly of the optical element driving mechanism according to an embodiment of the present disclosure.

Please refer to FIG. 6, the driving coil 11-322 is arranged along the optical axis 11-O, that is, the direction along which the driving coil 11-322 is arranged is parallel to the extending direction of the short side 11-21b‴ (please refer to FIG. 3, the sort side 11-21b‴ is parallel to the optical axis 11-O). The circuit board 11-321 further includes a connecting circuit 11-321d. The driving coil 11-322 does not overlap the connecting circuit 11-321d when observed in the direction perpendicular to the main axis 11-M. In the present embodiment, the driving coil 11-322 does not overlap the connecting circuit 11-321d when observed along the optical axis 11-O (in the present embodiment, the optical axis 11-O is perpendicular to the main axis 11-M). In addition, along the main axis 11-M, a greatest size 11-S2 of the driving coil 11-322 is different from a greatest size 11-S1 of the connecting circuit 11-321d. Specifically, along the main axis 11-M, the greatest size 11-S1 of the connecting circuit 11-321d is smaller than the greatest size 11-S2 of the driving coil 11-322, so that the connecting circuit 11-321d has a lower resistance.

Figure 7A:
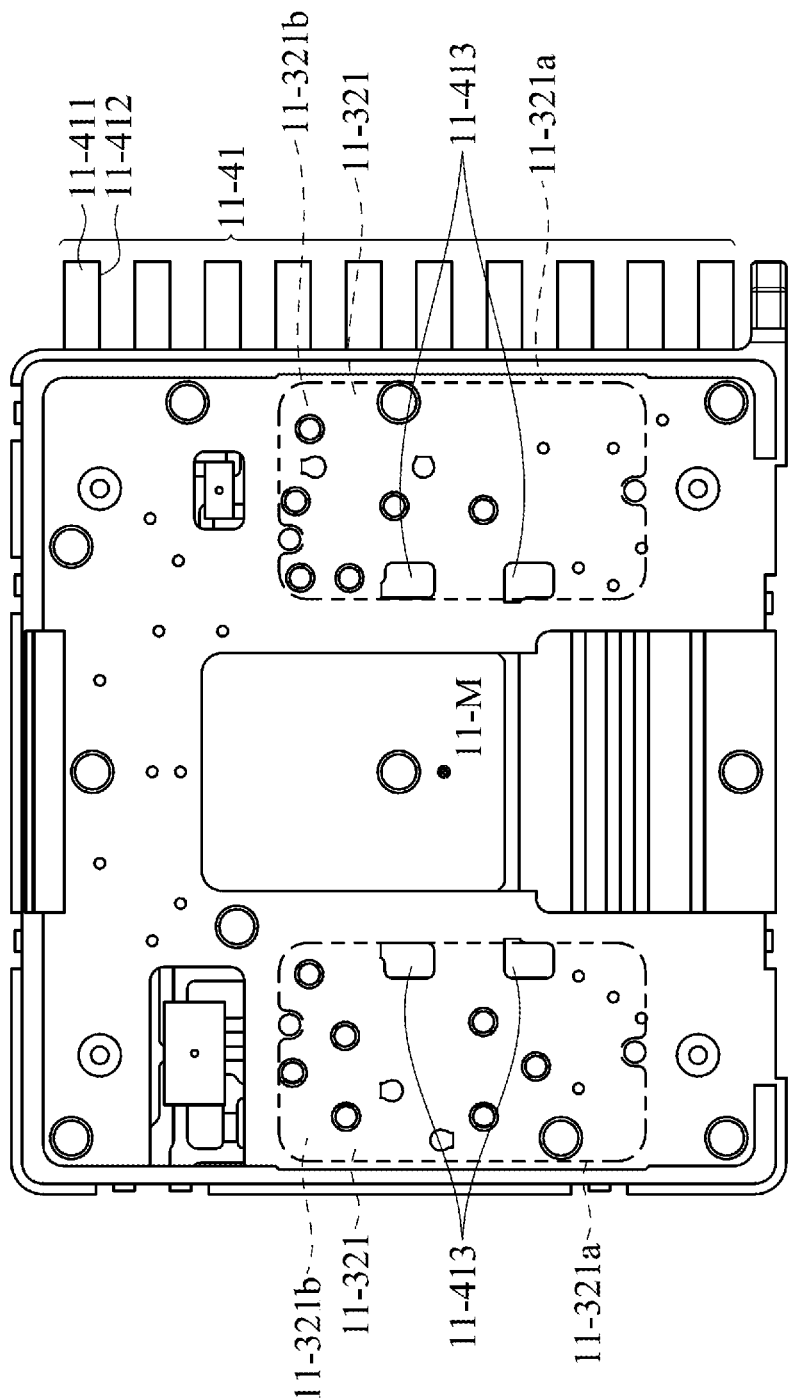
FIG. 7A shows a schematic view of the base, the circuit assembly and the circuit board of the optical element driving mechanism according to an embodiment of the present disclosure.
Figure 7B:
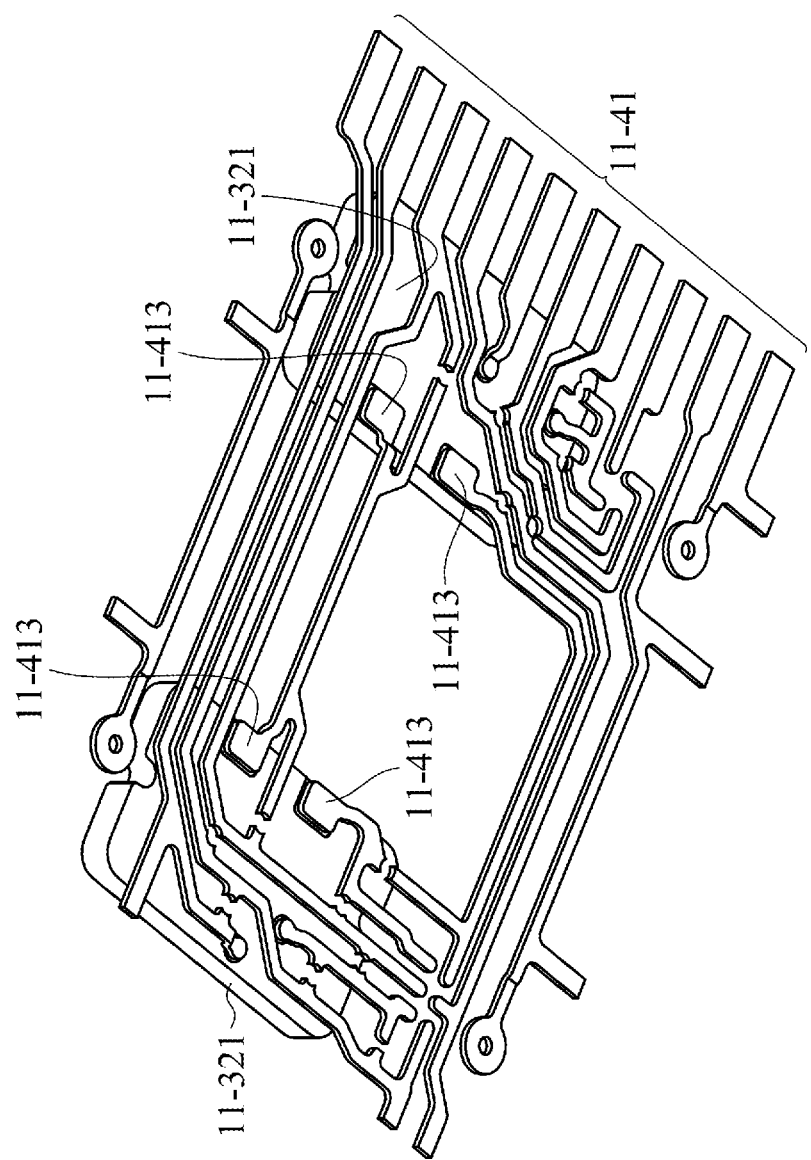
FIG. 7B shows a bottom view of a circuit and the circuit board of the optical element driving mechanism according to an embodiment of the present disclosure.
Figure 7C:
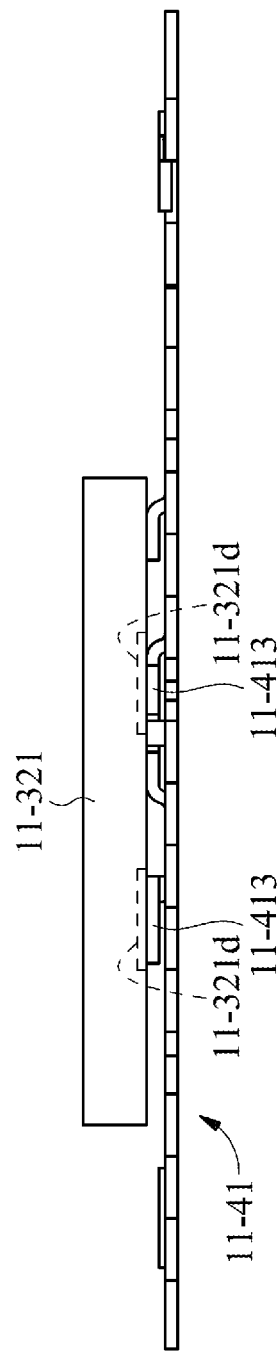
FIG. 7C shows a side view of the circuit assembly and the circuit board of the optical element driving mechanism according to an embodiment of the present disclosure.

Please refer to FIGS. 7A-7C, the first circuit surface 11-411 of the circuit 11-41 faces towards the circuit board 11-321, and the second circuit surface 11-412 faces opposite the first circuit surface 11-411. The circuit 11-41 may have a coil electrical connection part 11-413. The circuit board 11-321 is electrically connected to the circuit 11-41 of the circuit assembly 11-40 via the coil electrical connection part 11-413. The coil electrical connection part 11-413 is disposed between the first circuit board surface 11-321a of the circuit board 11-321 and the first circuit surface 11-411 of part of the circuit 11-41. The coil electrical connection part 11-413 at least partially overlaps the first circuit board surface 11-321a and the first circuit surface 11-411 when observed along the main axis 11-M. It should be noted that no coil electrical connection part 11-413 is provided on the second circuit board surface 11-321b of the circuit board 11-321 and the second circuit surface 11-412 of the circuit 11-41. Moreover, the coil electrical connection part 11-413 at least partially overlaps the second circuit board surface 11-321b and the second circuit surface 11-412 when observed along the main axis 11-M.

Figure 8A:
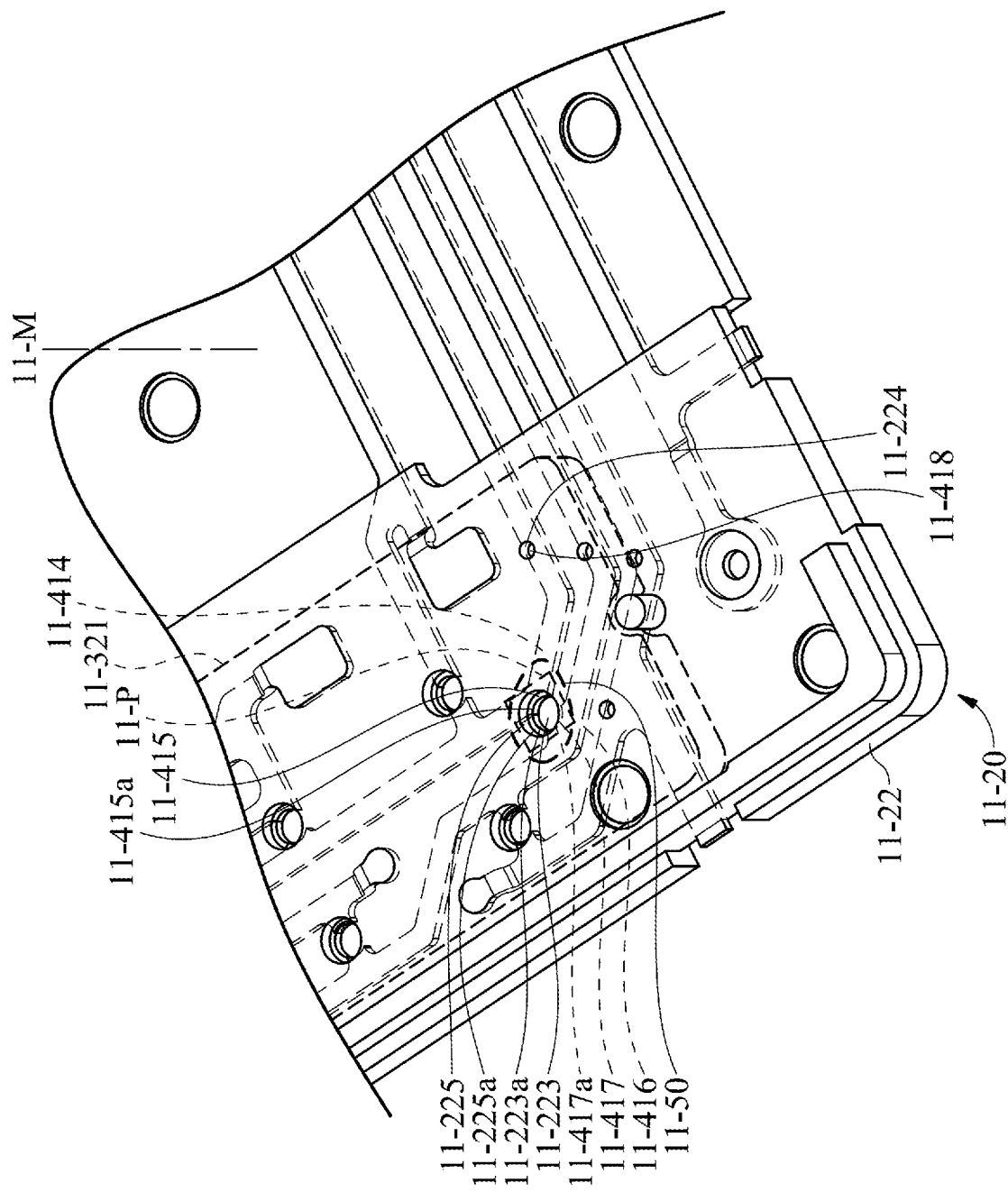
FIG. 8A shows a partial schematic view of the base, the circuit assembly, the circuit board and an adhesive element of the optical element driving mechanism according to an embodiment of the present disclosure, wherein the base and the circuit board are shown as a dashed line.
Figure 8B:
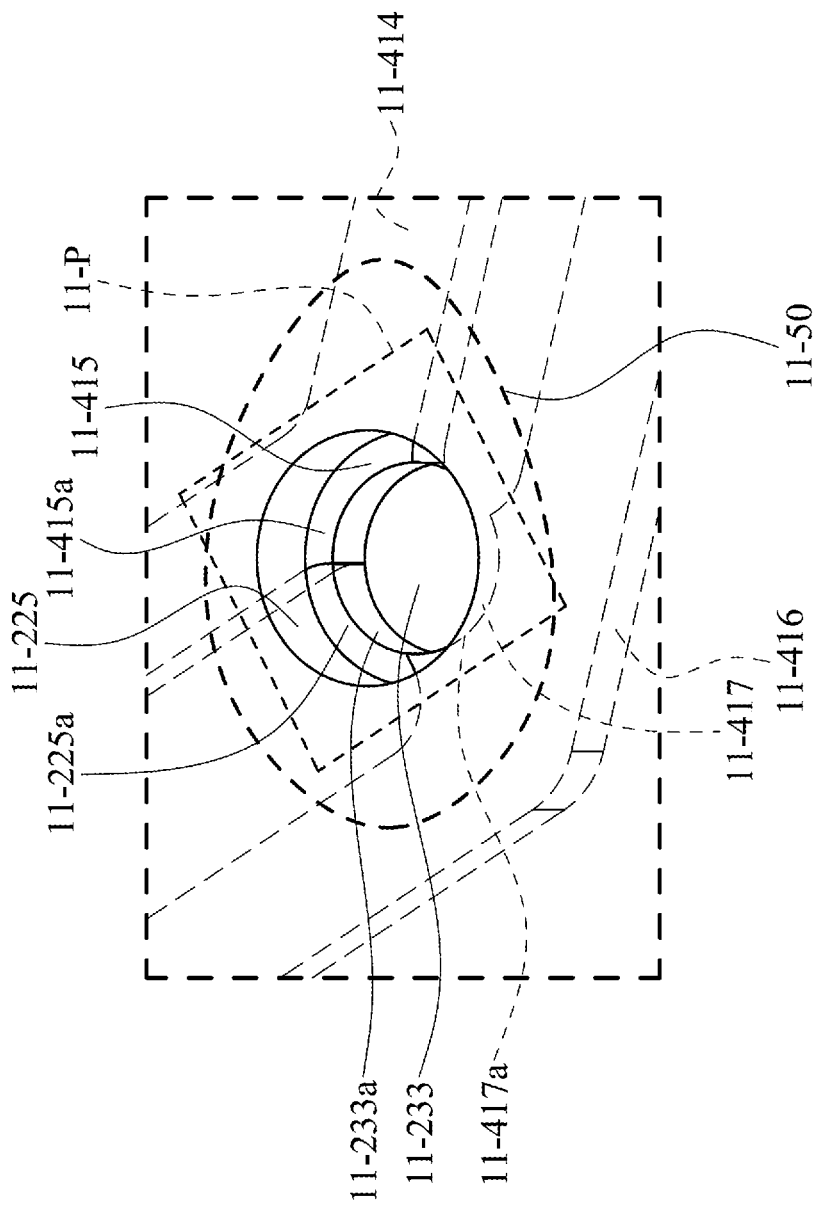
FIG. 8B shows a partial enlarged view of the base, the circuit assembly and the adhesive element of the optical element driving mechanism according to an embodiment of the present disclosure, wherein the base is shown as a dashed line.

Please refer to FIGS. 8A and 8B, FIG. 8A is a partial schematic view of the base 11-22, the circuit assembly 11-40, the circuit board 11-321 and the adhesive element 11-50, and FIG. 8B is a partial enlarged view of the base 11-22, the circuit assembly 11-40 and the adhesive element 11-50. As shown in FIGS. 8A and 8B, the circuit 11-41 may further include a first embedded part 11-414, a first exposed part 11-415, a second embedded part 11-416, and second exposed part 11-417 and a third exposed part 11-418. The first embedded part 11-414 is embedded in the base 11-22 of the fixed part 11-20 and is not exposed. The first exposed part 11-415 is electrically connected to the first embedded part 11-414 and is exposed to the first opening 11-223 of the base 11-22. The second embedded part 11-416 is embedded in the base 11-22 and is not exposed. The second exposed part 11-417 is electrically connected to the second embedded part 11-416 and is exposed to the first opening 11-223. In addition, the first embedded part 11-414 and the first exposed part 11-415 are electrically independent from the second embedded part 11-416 and the second exposed part 11-417. That is, the first opening 11-223 accommodates two circuits that are electrically independent from each other, rather than arranging the two circuits that are electrically independent from each other separately. In this way, processing and manufacturing of the optical element driving mechanism 11-100 may be facilitated, and the effect of miniaturization may be achieved.

As shown in FIG. 8A, the third exposed part 11-418 is partially exposed to the second opening 11-224 of the base 11-22, and the second opening 11-224 does not accommodate other circuits that are electrically independent from the third exposed part 11-418. The functions of the second opening 11-224 are not totally the same as that of the first opening 11-223. The second opening 11-224 may improve the heat dissipation efficiency of the third exposed part 11-418 to avoid the elements of the optical element driving mechanism 11-100 from overheating. Moreover, the second opening 11-224 may facilitate the processing and manufacturing of the optical element driving mechanism 11-100, and keep the third exposed part 11-418 at a desired position.

Please continue to refer to FIGS. 8A and 8B, the first exposed part 11-415 and the second exposed part 11-417 have a surface 11-415a and a surface 11-417a respectively, and the recess 11-225 of the base 11-22 has a recess surface 11-225a. The surface 11-415a of the first exposed part 11-415, the surface 11-417a of the second exposed part 11-417 and the recess surface 11-225a are located on a same imaginary plane 11-P. The first opening 11-223 further includes a first opening side 11-223a, the first opening side 11-223a is in contact with the recess surface 11-225a, but the first opening side 11-223a and the recess surface 11-225a are not parallel to each other. The first exposed part 11-415 and the second exposed part 11-417 are partially exposed to the first opening side 11-223a.

As shown in FIGS. 8A and 8B, the adhesive element 11-50 at least partially overlaps the first opening 11-223 when observed along the main axis 11-M. The adhesive element 11-50 here may be glue instead of soldering tin. Moreover, the adhesive element 11-50 at least partially overlaps the first opening 11-223 when observed in the direction perpendicular to the main axis 11-M. That is, the adhesive element 11-50 is disposed at the first opening 11-223 to fix and protect the first exposed part 11-415 and the second exposed part 11-417. In addition, the circuit board 11-321 at least partially overlaps the first opening 11-223 when observed along the main axis 11-M. In this way, the circuit board 11-321 may shield the first opening 11-223, and further prevent foreign matters such as dust from entering the first opening 11-223.

Figure 9:
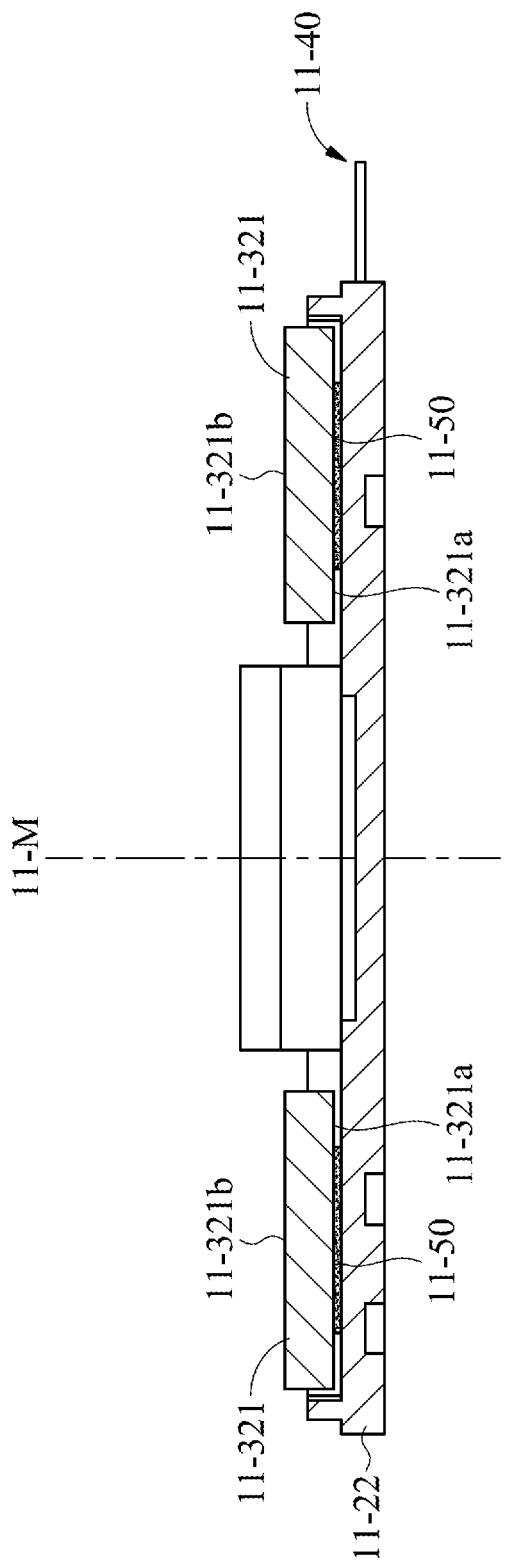
FIG. 9 shows a schematic view of the base, the circuit board and the adhesive element of the optical element driving mechanism according to an embodiment of the present disclosure.

As shown in FIG. 9, the adhesive element 11-50 of the optical element driving mechanism 11-100 is disposed between the circuit board 11-321 and the base 11-22, and the adhesive element 11-50 here may be soldering tin 11-50. It should be noted that, in some embodiments, the soldering tin 11-50 is only disposed between the circuit board 11-321 and the base 11-22. That is, the soldering tin 11-50 at least partially overlaps the circuit board 11-321 and the base 11-22 when observed along the main axis 11-M. However, the soldering tin 11-50 does not overlap the circuit board 11-321 and the base 11-22 when observed in the direction perpendicular to the main axis.

Figure 10:
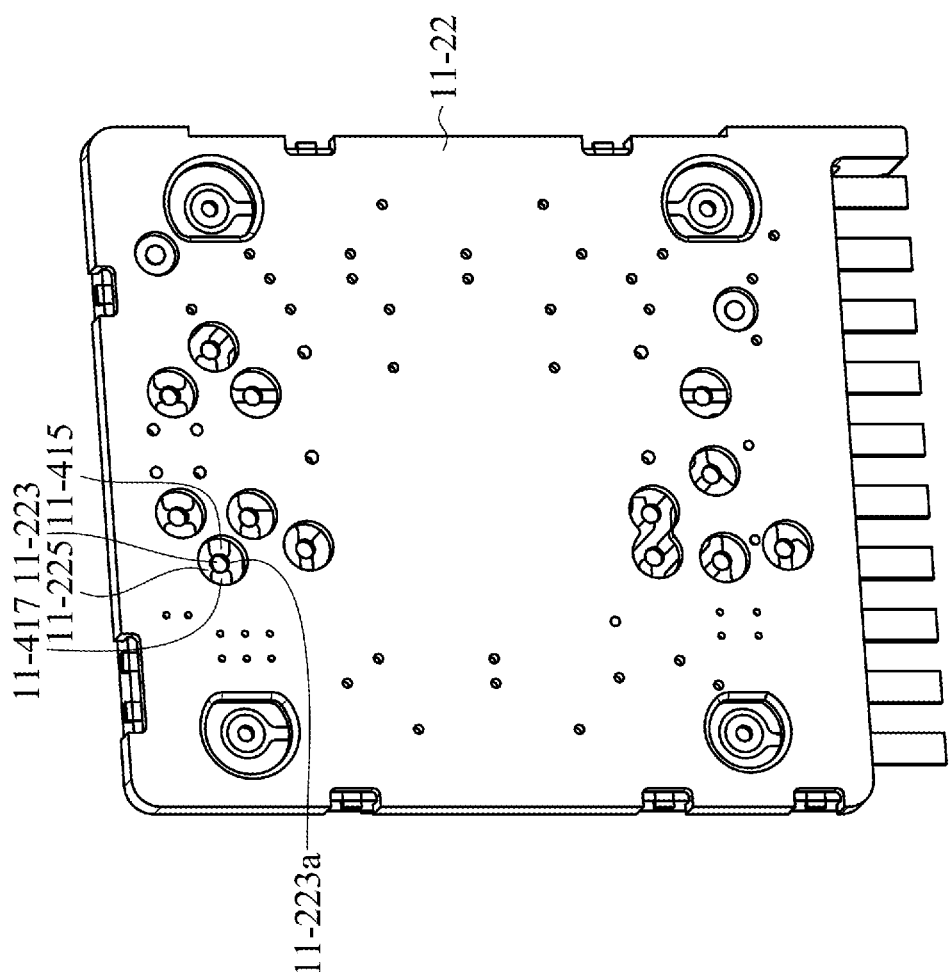
FIG. 10 shows a schematic view of the base and the circuit assembly of the optical element driving mechanism according to an embodiment of the present disclosure.

Please refer to FIG. 10, two sides of the first opening 11-223 of the base 11-22 may be provided with the recesses 11-225. In this way, the first exposed part 11-415 and the second exposed part 11-417 in the first opening 11-223 may be more securely connected to (or electrically connected to) other elements of the optical element driving mechanism 11-100 in the recess 11-225. In addition, since the first exposed part 11-415 and the second exposed part 11-417 are partially exposed to the first opening side 11-223a, the heat dissipation efficiency of the first exposed part 11-415 and the second exposed part 11-417 is increased to prevent the elements from overheating.

Figure 11:
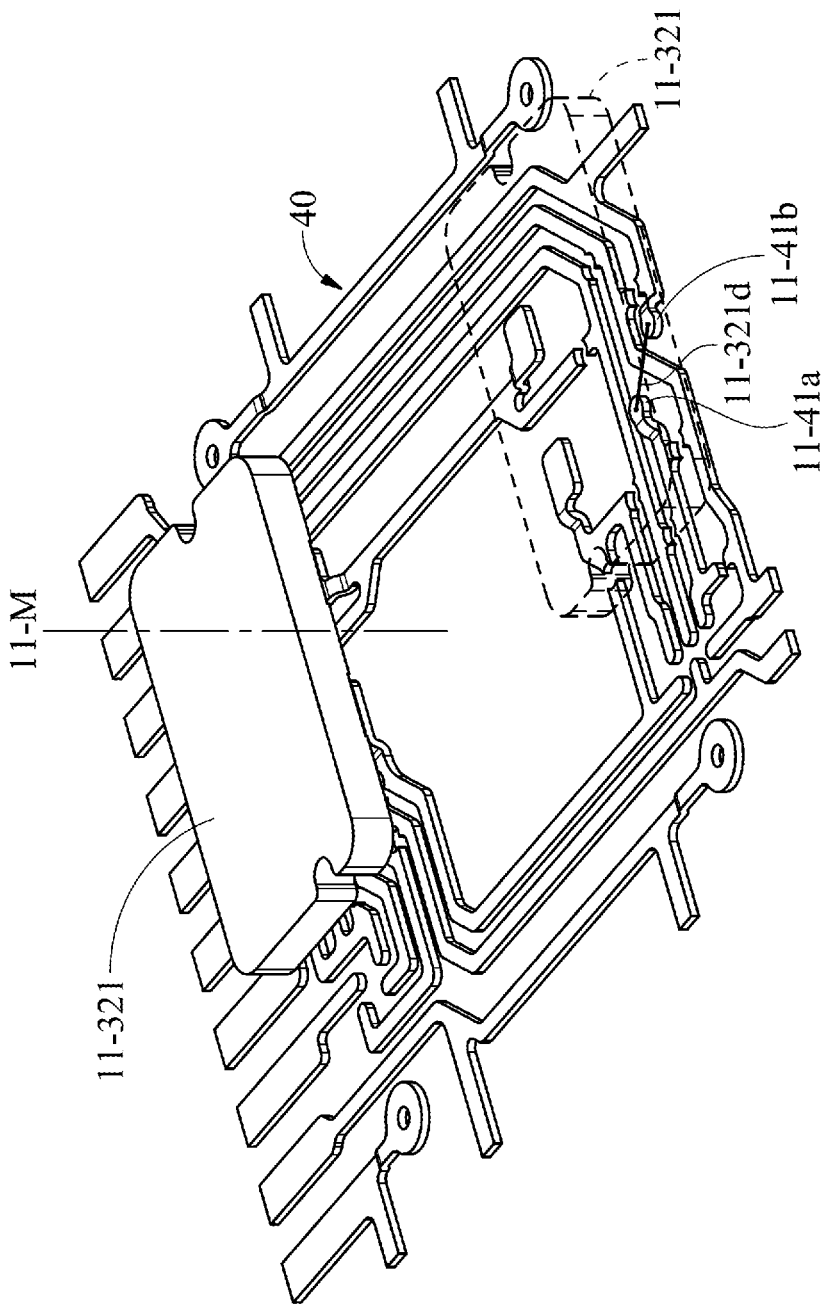
FIG. 11 shows a schematic view of a first segment and a second segment of the circuit assembly and the connecting circuit of the optical element driving mechanism according to an embodiment of the present disclosure.

Please refer to FIG. 11, the circuit 11-41 may further include a first section 11-41a and a second section 11-41b. The first section 11-41a is electrically connected to the second section 11-41b via the connecting circuit 11-321d of the circuit board 11-321. More specifically, the first section 11-41a is electrically connected to the connecting circuit 11-321d, and the connecting circuit 11-321d is electrically connected to the second section 11-41b. In this way, the first section 11-41a and the second section 11-41b may avoid the two-dimensional restriction by means of three-dimensional electrically connection (in the direction of the main axis 11-M), and the degrees of freedom for routing is increased.

In summary, the circuit assembly 11-40 of the optical element driving mechanism 11-100 is disposed in the base 11-22. That is, the optical element driving mechanism 11-100 of the present disclosure has the feature of circuit embedment. In this way, the optical element driving mechanism 11-100 may be integratedly manufactured, so that the structure of the optical element driving mechanism 11-100 is strengthened and the number of elements required by the optical element driving mechanism 11-100 is reduced, thereby achieving miniaturization of the optical element driving mechanism 11-100. The circuit embedment of the optical element driving mechanism 11-100 of the present disclosure not only has the above-mentioned functions, but also enables the embedded circuit to receive current, so that the circuit may be used as an electric circuit. In this way, the routing of the optical element driving mechanism 11-100 may be facilitated, and the optical element driving mechanism 11-100 does not require additional circuit assemblies, thereby achieving the effect of facilitating manufacturing and miniaturization.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:
1. An optical element driving mechanism, comprising:
    a movable part, for connecting to an optical element;
    a fixed part, wherein the movable part being movable relative to the fixed part, wherein the fixed part com- prises a base having a plate-like structure, and the base is perpendicular to a main axis;

a driving assembly, for driving the movable part to move relative to the fixed part; and a circuit assembly, electrically connected to the driving assembly, comprising:

a first embedded part, having a plate-like structure and not exposed to the base;

a first exposed part, electrically connected to the first embedded part and exposed to a first opening of the base;

a second embedded part, having a plate-like structure and not exposed to the base;

a second exposed part, electrically connected to the second embedded part and exposed to the first opening; and a first electrical connection part, having a plate-like structure and electrically connected to the driving assembly, wherein the first embedded part and the first electrical connection part are parallel to each other, wherein a first surface of the first embedded part does not overlap a second surface of the first electrical connection part when viewed along arbitrary directions that are perpendicular to the main axis, and the first surface and the second surface face the same direction.

2. The optical element driving mechanism as claimed in claim 1, wherein the first electrical connection part does not overlap the first opening when viewed along the main axis.

3. The optical element driving mechanism as claimed in claim 1, wherein a third surface of the second embedded part does not overlap a second surface of the first electrical connection part when viewed along the main axis.

4. The optical element driving mechanism as claimed in claim 3, wherein the first surface of the first embedded part and the third surface of the second embedded part are located on a same imaginary plane.

5. The optical element driving mechanism as claimed in claim 4, wherein the second surface of the first electrical connection part is not located on the imaginary plane.

6. The optical element driving mechanism as claimed in claim 1, wherein the second electrical connection part does not overlap the first opening when viewed along the main axis.

7. The optical element driving mechanism as claimed in claim 1, wherein the first exposed part is electrically independent from the second exposed part.

8. The optical element driving mechanism as claimed in claim 1, wherein the first electrical connection part is not exposed to the base.

9. The optical element driving mechanism as claimed in claim 1, wherein the first electrical connection part at least partially extends along the main axis.

10. The optical element driving mechanism as claimed in claim 1, wherein the second surface of the first electrical connection part is perpendicular to the main axis.

11. The optical element driving mechanism as claimed in claim 1, wherein the first surface of the first embedded part does not overlap the second surface of the first electrical connection part when viewed along the main axis.

12. The optical element driving mechanism as claimed in claim 1, wherein the first surface of the first embedded part is exposed to the base.

13. The optical element driving mechanism as claimed in claim 1, wherein the circuit assembly further comprises a third exposed part partially exposed to a second opening of the base, and the second opening does not accommodate other circuits that are electrically independent from the third exposed part.

14. The optical element driving mechanism as claimed in claim 1, wherein the base further comprises a plurality of recesses disposed at two sides of the first opening.

15. The optical element driving mechanism as claimed in claim 1, wherein the base further comprises a recess, a surface of the first exposed part, a surface of the second exposed part and a recess surface of the recess are located on a same imaginary plane.

16. The optical element driving mechanism as claimed in claim 15, wherein the first opening further comprises a first opening side in contact with the recess surface, but the first opening side and the recess surface are not parallel to each other, the first exposed part and the second exposed part are at least partially exposed to the first opening side.

17. The optical element driving mechanism as claimed in claim 1, wherein the driving assembly further comprises a driving magnetic element and a driving coil assembly, and the driving coil assembly comprises a circuit board and a driving coil disposed at the circuit board.

18. The optical element driving mechanism as claimed in claim 17, wherein the circuit board at least partially overlaps the first opening when viewed along the main axis.

19. The optical element driving mechanism as claimed in claim 17, further comprising an adhesive element disposed between the circuit board and the base, wherein the adhesive element at least partially overlaps the first opening when viewed along the main axis.

20. The optical element driving mechanism as claimed in claim 19, wherein the adhesive element at least partially overlaps the first opening when viewed in the direction perpendicular to the main axis.

* * * * *